May 12, 1942. N. V. CHRISTENSEN Re. 22,094
SEWING MACHINE
Original Filed July 9, 1931 5 Sheets-Sheet 1
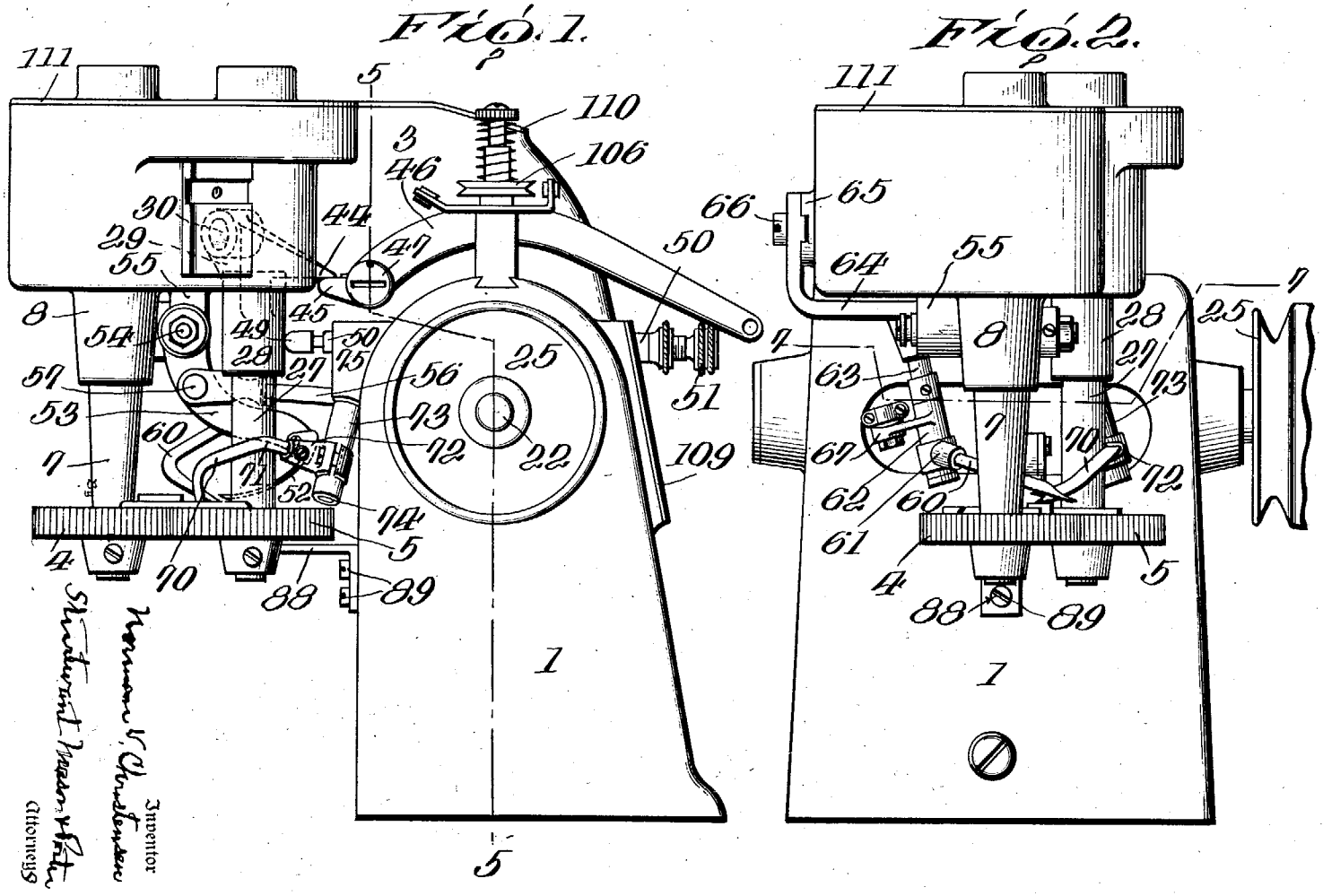
Inventor
Norman V. Christensen
Shurtleff Mason & Porter
Attorneys SEWING MACHINE
Original Filed July 9, 1931 5 Sheets-Sheet 2
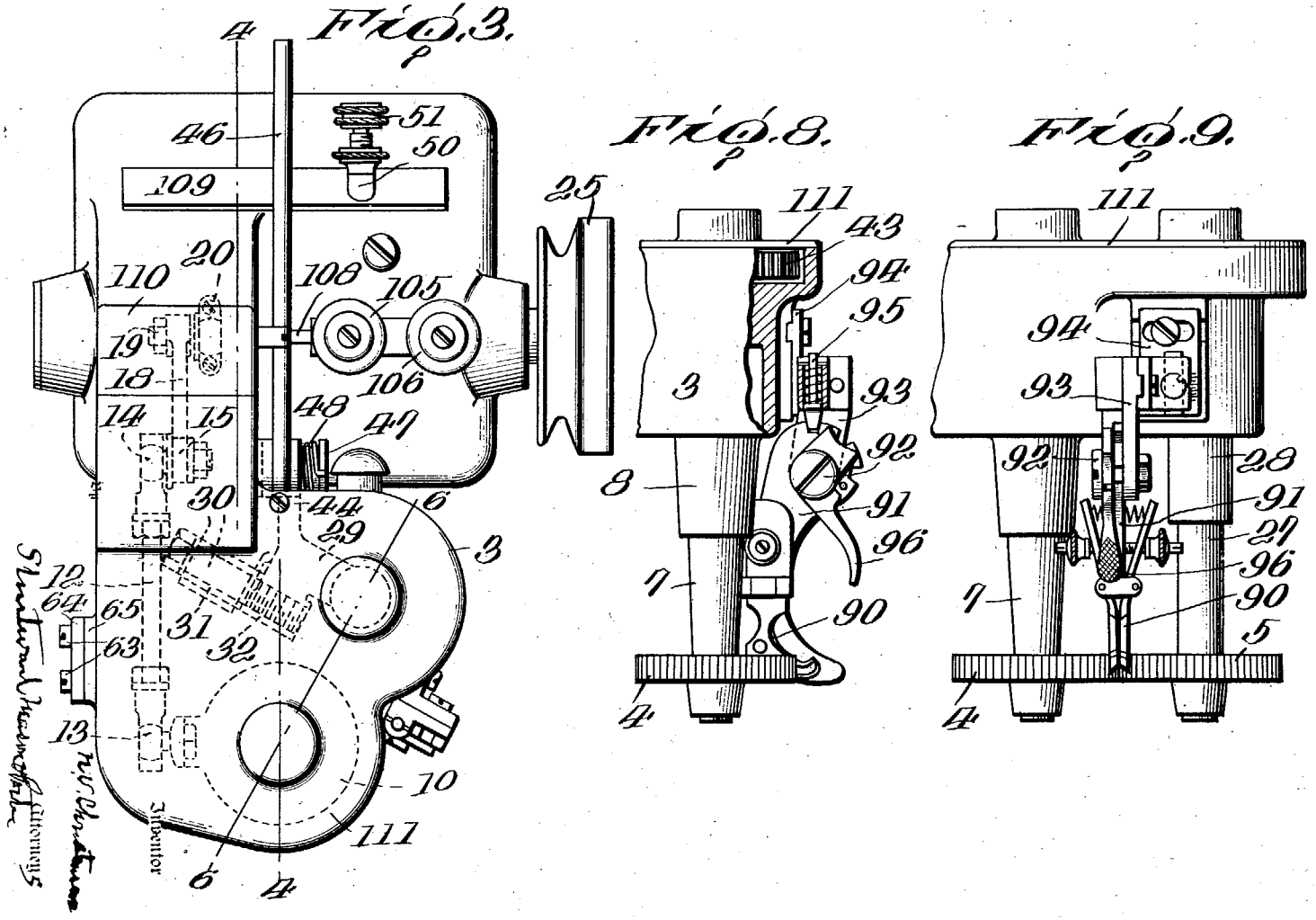

May 12, 1942. N. V. CHRISTENSEN Re. 22,094
SEWING MACHINE
Original Filed July 9, 1931 5 Sheets-Sheet 3
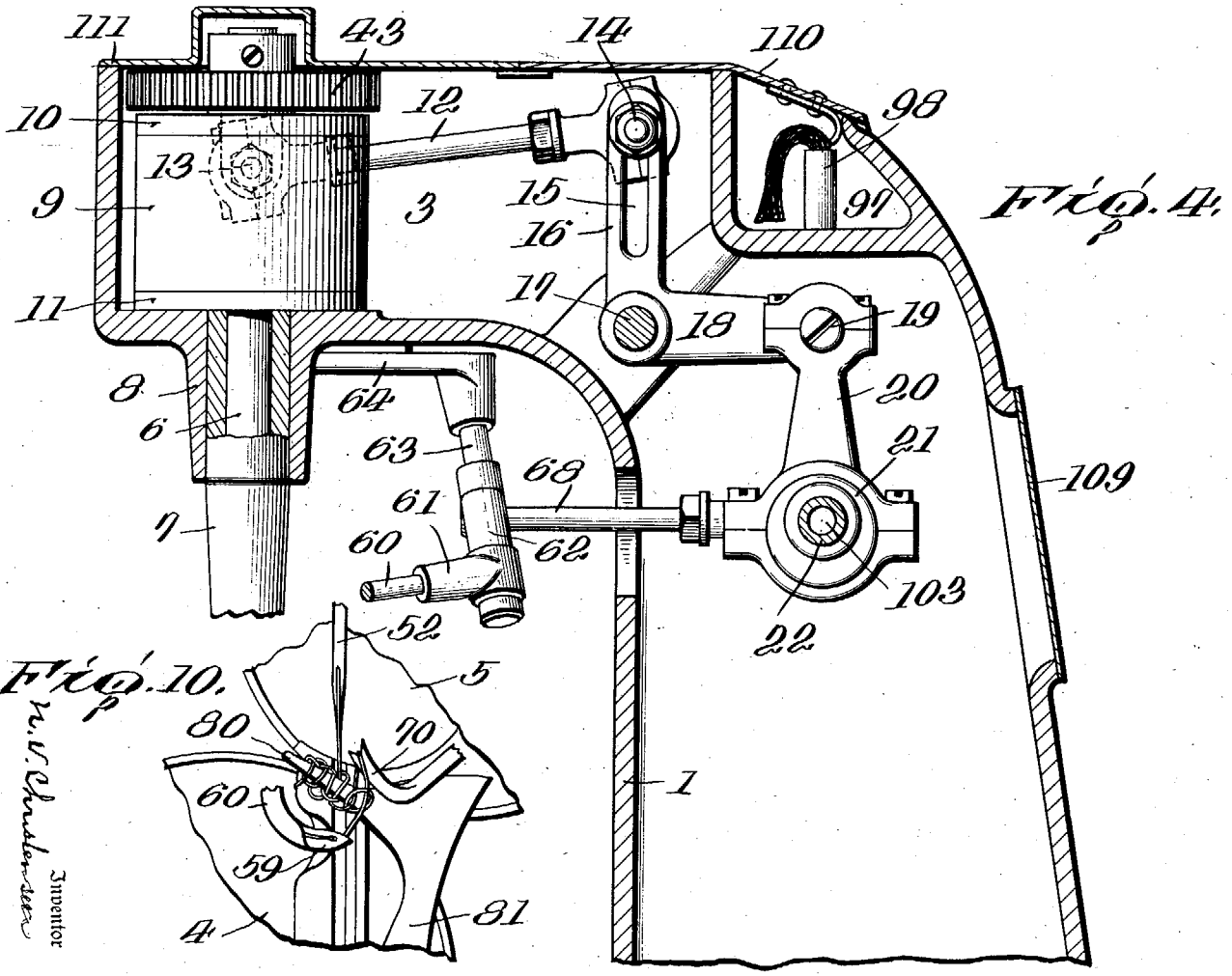
Inventor
N. V. Christensen
By Shurtleff and Mason & Porter
Attorneys May 12, 1942. N. V. CHRISTENSEN Re. 22,094
SEWING MACHINE
Original Filed July 9, 1931 5 Sheets-Sheet 4
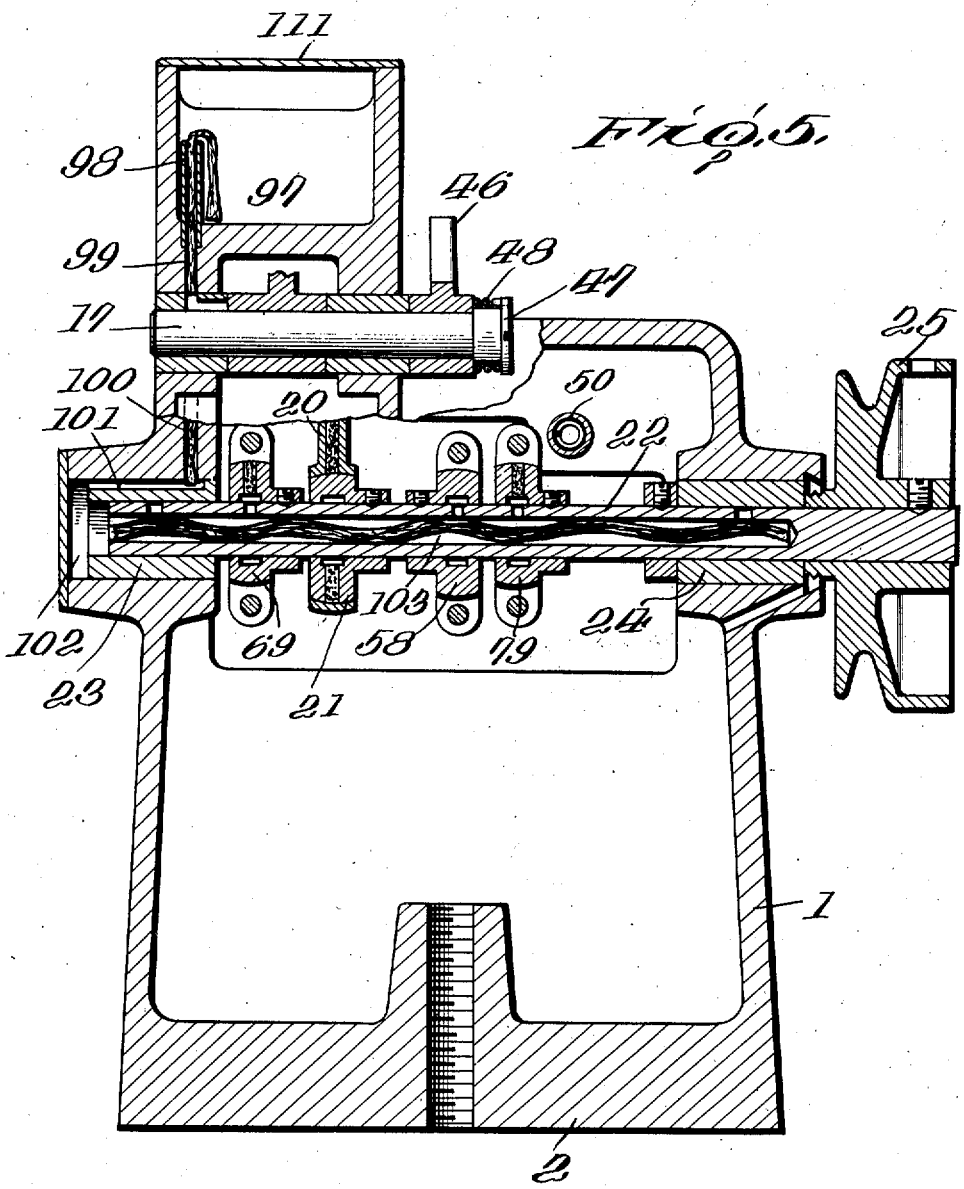
Inventor
N. V. Christensen
By Sturtevant Mason & Porter
Attorneys May 12, 1942. N. V. CHRISTENSEN Re. 22,094

SEWING MACHINE

Original Filed July 9, 1931 5 Sheets-Sheet 5

Inventor
N. V. Christensen
By
Shurtleff and Pearson & Porter
Attorneys.

Reissued May 12, 1942

Re. 22,094

UNITED STATES PATENT OFFICE 22,094

SEWING MACHINE

Norman V. Christensen, Chicago, Ill., assignor to Union Special Machine Company, Chicago, Ill., a corporation of Illinois Original No. 1,995,092, dated March 19, 1935, Serial No. 549,787, filed July 9, 1931. Application for reissue filed June 21, 1941, Serial No. 399,218

45 Claims. (Cl. 112—16)

The invention relates to new and useful improvements in a sewing machine having feed wheels rotating about vertical axes for supporting and feeding the fabric to the stitching mechanism, and commonly known as a cup feed machine.

An object of the invention is to provide a machine of the above type wherein the feed wheels are supported from above by an overhanging bracket so as to provide a clearance space beneath the feed wheels for the manipulation and handling of the fabric being stitched.

Another object of the invention is to provide a machine of the above type wherein the main shaft and all of the parts operated thereby for actuating the feed wheels and the stitching mechanism are located above the feed wheels so as to simplify and reduce the necessary parts for imparting movement from the main shaft to the feed wheels and stitch forming devices.

A further object of the invention is to provide a machine of the above type wherein the stitch forming mechanism consists of cooperating devices, each of which has a back and forth movement in a single plane.

A still further object of the invention is to provide a machine having feed wheels rotating about vertical axes wherein said axes are located in a plane cutting a vertical plane containing the reciprocating needle at an acute angle.

A still further object of the invention is to provide a machine of the above type wherein the feed wheels are mounted on and supported by the lower ends of the actuating shafts therefor.

These and other objects will in part be obvious and will in part be hereinafter more fully disclosed.

In the drawings which show by way of illustration one embodiment of the invention—

Figure 1 is a side view of a machine embodying the invention;

Figure 2 is a front view of the same;

Figure 3 is a plan view of the same;

Figure 4 is a sectional view on the line 4—4 of Fig. 3;

Figure 5 is a sectional view on the line 5—5 of Fig. 1;

Figure 8 is a view partly in side elevation and partly in section showing the outer feed wheel and the fabric guide for directing the fabric sections to the feed wheels;

Figure 9 is a side view of the feed wheels showing the fabric guide in place; and Figure 10 is a detail view of the various stitch forming elements illustrating the concatenations of the threads in forming the overedge stitch.

Figure 7:
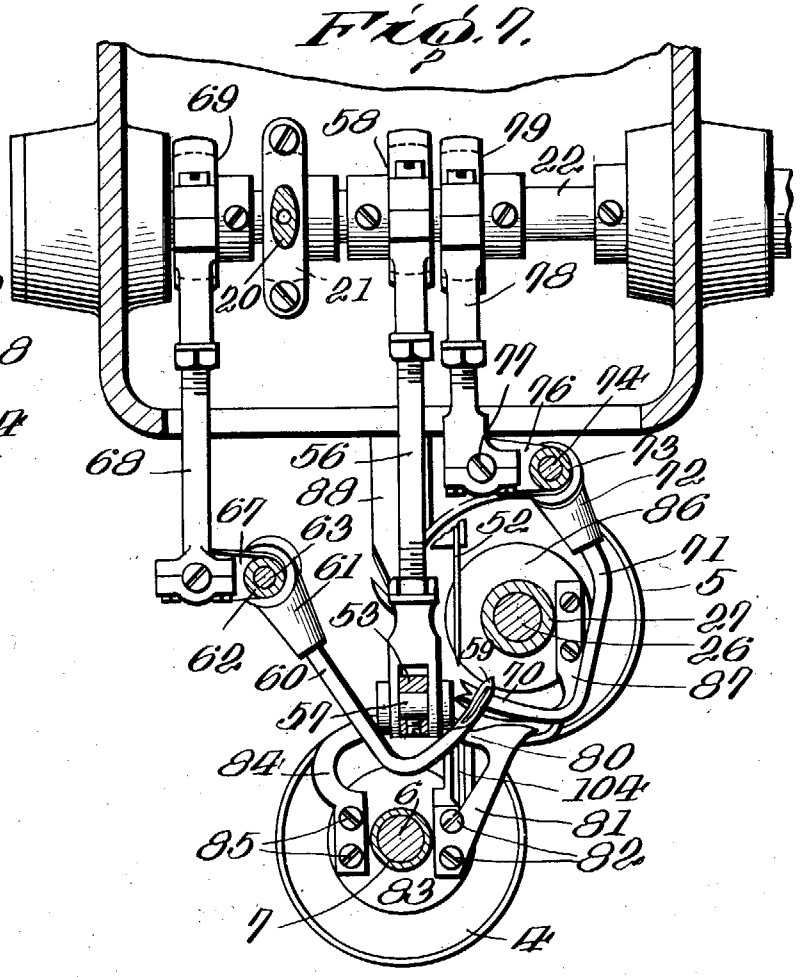
Figure 7 is a view partly in plan and partly in section on the line 7—7 of Fig. 2.

The invention is directed to a sewing machine having feed wheels mounted for rotation about vertical axes. These feed wheels are attached to the lower ends of the operating shafts therefor, and the operating shafts are mounted in an overhanging supporting bracket carried by a standard provided with a supporting base. Mounted in the standard in suitable bearings therefor is a main actuating shaft, and this main actuating shaft is located above the feed wheels. One of the feed wheels is intermittently operated by a train of devices actuated by the main shaft. The other feed wheel is connected thereto by a gear so that both feed wheels are positively driven. The axes of the shafts are mounted in a vertical plane cutting the axis of the main shaft at an acute angle. The inner feed wheel is mounted so that it may be moved away from the outer feed wheel for the insertion of the material that is to be stitched. The needle for penetrating the fabric sections projecting above the feed wheels is mounted for movement in a vertical plane at right angles to the axis of the main shaft and cutting the plane containing the axes of the feed wheels at an acute angle. The needle is preferably a curved needle and is attached to an oscillating lever which is connected directly to a pitman cooperating with an eccentric member on the main actuating shaft. A thread carrying member is mounted for oscillation on a supporting shaft and disposed so as to engage the needle thread loop thrown out by the needle after it passes through the fabric sections. This shaft is inclined to a vertical plane containing the needle, and also to a vertical plane containing the fabric sections being stitched, so that the thread carrying member will pass close to the needle when engaging the needle thread loop, and will then move upwardly and inwardly to a point above the edges of the fabric sections being stitched. Cooperating with this first-named thread carrying member and with the needle as it enters the fabric is a second thread carrying looper which is likewise mounted on a shaft for oscillation. The shaft carrying the second thread carrying looper is inclined to a vertical plane containing the needle, and also to a vertical plane containing the fabric sections, so that this second thread carrying looper will cooperate with the first thread carrying looper at a point above the edge of the fabric sections being stitched, and then move to a position where the needle cooperates with said second thread carrying looper as it moves forward to enter the fabric sections. The stitch forming mechanism therefor includes three cooperating elements, each of which moves back and forth in a single plane. The thread carrying looper cooperating with the needle after it passes through the fabric sections is mounted on the overhanging bracket, and the support for the looper is oscillated by an eccentric strap connected to an arm carried thereby and cooperating with an eccentric member on the main shaft. The shaft carrying the second thread carrying looper is mounted on the outer face of the standard and operated by an eccentric strap which is connected to an arm carried by a shaft and which cooperates with an eccentric member on the main actuating shaft. Means is provided for separating the feed wheels to permit the insertion of the material. Fabric guiding means is provided for directing the fabric to the feed wheels, and associated with the feed wheels are the usual stitch finger, fabric stripping devices and thread cutter.

It is thought that the invention will possibly be better understood by a detail description of the present illustrated embodiment. The machine includes a supporting standard or housing 1 having a base 2 provided with suitable means whereby said standard or housing may be attached to a supporting table. This standard or housing is provided at one side thereof with a laterally projecting overhanging bracket 3. The housing or standard, together with its supporting base and projecting bracket constitutes the entire frame of the machine. This bracket, as shown, is formed integral with the standard. It may, however, be made separate, if desired. The feed wheels for supporting and feeding the fabric sections are carried by this overhanging bracket 3. The outer feed wheel is indicated in the drawings at 4, and the inner feed wheel at 5. The outer feed wheel is attached to a shaft 6 mounted for rotation in a bearing sleeve 7 which is supported in a depending sleeve 8 carried by the overhanging bracket 3. At the upper end of the shaft 6 is a clutch drum 9 to which intermittent rotation is imparted by means of a clutch disk 10. The clutch drum 9 is prevented from retrograde movement by a disk 11 which is attached to the overhanging bracket. This clutch mechanism for imparting the intermittent feed motion to the feed wheel carried by the shaft 6 may be of any desired character. As illustrated, it is of the type shown in the patent granted to Long and Sliwa November 20, 1928, No. 1,692,130, and detail description of this clutch operating mechanism is not thought necessary. The clutch drum is oscillated by means of a link 12 which is pivoted to a ball stud 13 carried by an arm attached to the disk 10. The link 12 is pivoted to a ball stud 14 adjustably mounted in a slot 15 of the arm 16 of the bell crank lever. This bell crank lever is fixed to a shaft 17 mounted in suitable bearings in the frame of the machine. The arm 18 of the bell crank lever carries a ball stud 19 to which the eccentric strap 20 is attached. The eccentric strap cooperates with an eccentric member 21 carried by the main shaft 22. As shown, said eccentric member is in the form of a ball eccentrically mounted on the shaft. It may be in the form of a crank or otherwise constructed for imparting the rocking motion to the bell crank lever.

The main actuating shaft 22 is mounted in suitable bearings 23 and 24 carried by the standard of the machine. Said shaft is rotated by means of a belt wheel 25.

The feed wheel 5 is carried by a shaft 26 which is mounted in a bearing sleeve 27 supported in a bearing sleeve 28 carried by a rock lever 29 secured to a stud 30, which stud is journaled in a bushing 31 mounted in a lug 32 projecting from the inner wall of the overhanging bracket 3. The shaft 26 is prevented from endwise movement in the sleeve 27 by the opposed faces of the feed wheel 5, and a thrust collar 33 which is secured to the upper end of the shaft by a set screw 34. A shaft 35 slidably engages a recess 36 in the shaft 26 and is keyed to the shaft 26 by a lug 37 which engages a slot in the upper end of the shaft 26. This causes the shafts to rotate together, but permits a slight endwise movement of one shaft relative to the other. The shaft 35 is connected through a universal joint 38 to a shaft 39 mounted for rotation in a bushing 40 carried by a lug 41 projecting inwardly from the inner wall of the overhanging bracket 3. On the upper end of this shaft 39 is a gear wheel 42 which meshes with a gear wheel 43 fixed to the shaft 6. When the shaft 6 is turned for feeding the material it will, through the gear 43, positively rotate the gear wheel 42 which is positively connected to the shaft 26, and thus both of the feed wheels will be positively rotated through the intermittent clutch mechanism referred to. By shifting the stud 14, the extent of feeding movement imparted to the feed wheels may be varied.

It is noted that the main shaft 22 is located above the feed wheels, as shown in Fig. 1, and both feed wheels are positively driven by a clutch mechanism which is connected to an eccentric member on the mainshaft simply through the rock lever, the eccentric strap for oscillating the same, and the link for transmitting the oscillations of the rock lever to the clutch drum. These operating parts lie substantially in a single plane at right angles to the main actuating shaft.

The feed wheels are separated by swinging the rock lever 29. This is accomplished in the following manner. The rock lever 29 is provided with a laterally projecting arm 44 which extends through the wall of the overhanging bracket and is adapted to be engaged by the lug 45 carried by a lever 46 which is freely mounted on an extension of the shaft 17. This lever extends to the rear of the machine and is adapted to be connected with any suitable manually operated means for oscillating the lever, and when the lever is depressed, it will lift the arm 44 so as to swing the rock lever and thus separate the feed wheels. There is a coiled tension spring 48 which normally turns the lever 46 in a counter clockwise direction as viewed in Fig. 1, so as to release the arm 44 when the manually operated means releases the lever 46. The inner feed wheel is moved outwardly for clamping the fabric against the outer feed wheel by means of a plunger 49. Said plunger 49 is mounted in a tube 50 which extends through the standard. In this tube is a compression spring bearing against the end of the plunger and normally forcing the same to the left as viewed in Fig. 1. An abutment screw 51 threaded into the tube bears against the inner end of the compression spring.

The compression spring in turn bears against the plunger and normally forces the same outward, so that the outer rounded head end thereof bears against the bearing sleeve 28 supporting the inner feed wheel. By this arrangement, the inner feed wheel is yieldingly pressed against the outer feed wheel, and may, at the will of the operator, be separated therefrom to permit the insertion or removal of the material being stitched.

The material being stitched is clamped between the feed wheels 4 and 5 so as to project slightly above the same. The fabric is thus supported and fed to the stitching mechanism. The stitching mechanism includes a needle 52 which as shown in the drawings is a curved needle. The needle 52 is carried by a needle lever 53. The lever 53 is pivotally supported on a stud 54 carried by a lug 55 formed integral with the overhanging bracket 3. An eccentric strap 56 is pivoted at 57 to the lever, and cooperates with an eccentric 58 on the main actuating shaft 22. The needle lever is mounted so that the needle moves back and forth in a vertical plane cutting the axis of the actuating shaft substantially at right angles. The plane of the needle, however, cuts the vertical plane containing the axes of the shafts supporting the feed wheels 4 and 5 at an acute angle. The shaft 26 supporting the inner feed wheel is at one side of the plane of oscillation of the needle, while the shaft 6 supporting the outer feed wheel is at the other side of this plane, and the plane of oscillation of the needle intersects the plane containing the axes of the shafts supporting the feed wheels substantially at the point of contact between the feed wheels. Thus the fabric sections are firmly gripped and supported at a point adjacent where the needle penetrates the fabric sections. By this arrangement of the axes of the shafts of the feed wheels, clearance is provided above the feed wheels for the needle and its operating mechanism, notwithstanding that the plane of oscillation of the needle intersects the gripping point between the feed wheels. Furthermore, by this arrangement of the feed wheels, the operator feeding the material to the feed wheels can sit in a much more comfortable position than is possible in the feeding of a machine of this type where the feed wheels are mounted so as to rotate about axes lying in a plane parallel with the line of reciprocation of the needle. In the present embodiment of the invention, the line of feed is inclined to the front face of the machine and the axis of the main actuating shaft, and of course, will be in a plane inclined from the operator toward the front edge of the table supporting the machine. This gives the operator more room to handle the material, and, as noted, a more comfortable sitting position for feeding the material to the machine. The operator also has the advantage of full clearance beneath the feed wheels, as both feed wheels are supported from above.

Cooperating with the needle as it emerges from the material is a thread carrying member 59 which is shown in the form of a looper having an eye and carrying its own thread. This looper is provided with a shank 60 mounted in an arm 61 attached to a sleeve 62 which in turn is mounted for free oscillation on a supporting stud 63. The supporting stud 63 is carried by an arm 64 projecting laterally from a supporting bracket 65 which is secured to the outer face of the overhanging bracket 3 by suitable bolts 66. The sleeve 62 is provided with a projecting arm 67 carrying a ball stud to which a link 68 is attached. This link 68 cooperates with an eccentric 69 on the main actuating shaft 22. The axis of the stud 63 lies in a line which is inclined to the vertical plane in which the needle moves back and forth. It is also inclined to a vertical plane containing the fabric sections being stitched, and, therefore, the path of movement of the looper 59 is such that the looper point will pass into the needle thread loop thrown out by the needle, and then the looper will move upwardly and toward the machine to a point over and beyond the edges of the fabric sections being stitched. In Fig. 7 the looper is shown as moved to the extreme end of its forward stroke.

Cooperating with this looper 59, and with the needle before it penetrates the fabric sections, is a thread manipulating member 70 which, as shown in the drawings, is a non-thread carrying looper and has a forked end adapted to engage the looper thread loop of the looper 59. This looper is provided with a shank 71 which is mounted in an arm 72 clamped to a sleeve 73 mounted in turn for oscillation on a stud 74. The stud 74 is mounted in a lug or bracket 75 formed as an integral part of the standard or frame of the machine. The sleeve 73 carries a projecting arm 76 which is provided with a ball stud 77. An eccentric strap 78 is attached to the ball stud 77 and cooperates with an eccentric 79 on the main actuating shaft 22.

The axis of the stud 72 is inclined to the vertical plane containing the path of oscillation of the needle. It is also inclined to the plane of movement of the fabric sections and, therefore, the looper 70 will move from a position beneath the looper 59 so as to engage the looper thread loop and carry the same downwardly and toward the inner side of the fabric section so as to position said looper thread loop for the needle to enter as it advances for entering the fabric sections.

It will be noted from the above that the stitch forming mechanism is a very simple form of mechanism wherein each element of the stitch forming mechanism moves back and forth in a single plane and no lateral movement is necessary to any one of the stitch forming elements. The stitch forming mechanism is, therefore, very positive in its action, the needle thread loop being entered with certainty by the looper 59 and the looper thread loop being entered with certainty by the hook end of the looper 70, and the looper thread will be positively positioned with certainty for the needle to enter. This all contributes to a very high speed machine, wherein there is no skipping of the stitches. Furthermore, the needle is oscillated by direct connection of the supporting lever therefor to an eccentric strap. Each of the loopers is also oscillated by a direct connection from an arm rigid with the looper supporting member with an eccentric on the main actuating shaft. The number of parts for actuating the thread stitching elements are reduced to a minimum, each operating mechanism only having the one connection between the eccentric member which actuates the same and the stitching implement operated thereby. Therefore, the parts will maintain their timing and can be operated rapidly and with little consumption of power. All of the parts of the stitch forming devices, except the eccentrics and the eccentric straps, are outside of the main housing or standard carrying the main actuating shaft. All of these parts, together with the main shaft, and also the devices for operating the feed wheels, are arranged above the plane of the feed wheels. This is what enables few operating parts to be used, and the compact, simple actuating devices utilized, which have been described above.

It will be understood that instead of a thread carrying looper cooperating with a needle, a non-thread carrying looper may be used, and, likewise, instead of a non-thread carrying looper operating to position the loop for the needle to enter, a thread carrying looper may be used, in which case this non-thread carrying looper will be positioned for entering the needle loop. Wherever the looper is referred to, it is understood that it may be either of the thread carrying type or a non-thread carrying type.

Figure 6:
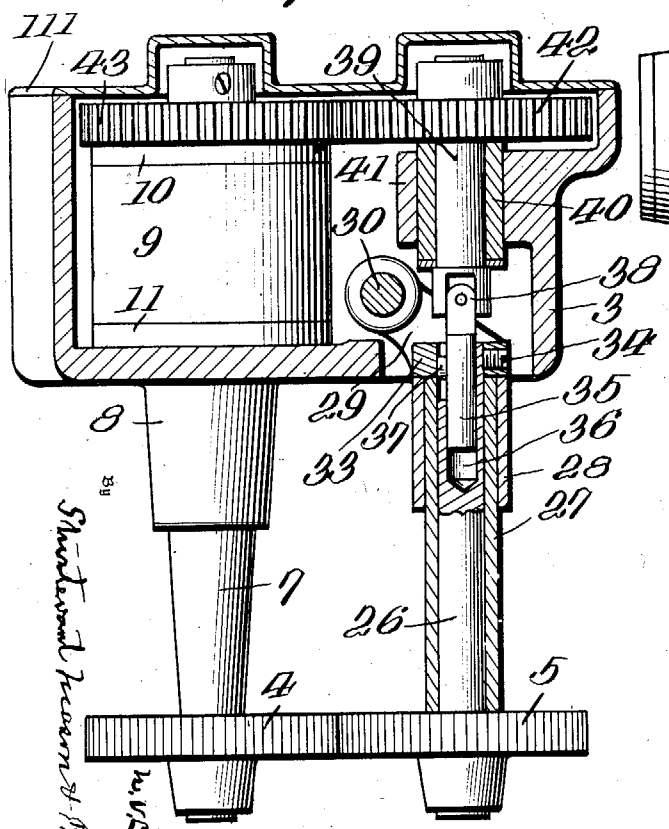
Figure 6 is a sectional view through the supporting bracket for the feed wheels on the line 6—6 of Fig. 3, and showing also in section the supporting parts for the inner feed wheel.

The stitch finger 80 is provided, which stitch finger is carried by an arm 81 secured by suitable screws 82, 82 to a flange 83 formed as a part of the sleeve 7. For the sake of clearance of illustration, this stitch finger is not shown in Figures 6, 8 and 9. The stitch finger overlies the upper edges of the fabric sections. The needle passes beneath the same as it enters the fabric sections, and the thread loops are carried over the stitch finger and are drawn against the same and finally fed off from the end of the stitch finger.

Also mounted on the flange 83 is a stripper member 84 secured to the flange by screws 85, 85. This is a fabric stripping member which strips the stitched fabric from the teeth of the feed wheel 4. The sleeve 27 is also provided with a flange 86 on which is mounted a stripper and guide member 87. There is also a stripper plate and thread cutter 88 secured to the frame of the machine by suitable screws 89, 89. The stripper plate and thread cutters are of the usual character, except as to the manner of supporting the same. All of these parts are carried by the sleeves 7 and 27 in which the shafts supporting the feed wheels are mounted, except the thread cutters and the stripper associated therewith which is carried by the main frame, and positioned so as to permit the inner feed wheel to move away from the same. It will be noted that this inner feed wheel, as shown in Fig. 3 of the drawings, is mounted for movement in a plane containing the axes of the shafts supporting the feed wheels, and, therefore, in a plane at right angles to the line of feed.

The machine is particularly adapted for sewing stockings, and an uncurler is provided which is shown at 90 in the drawings, and this uncurler includes the usual guide plate and associated uncurling guide members, and is mounted on an arm 91 pivoted at 92 to a bracket 93. The bracket 93 is in turn secured to a supporting bracket 94 so that it may be properly adjusted for positioning the guide relative to the feed wheels. A yielding locking bolt 95 is provided for holding the guide in set positions. A hand lever 96 is arranged for releasing the locking bolt and for swinging the guide. This guide and the parts just described form no part of the present invention, and it will be understood that other types of guiding devices may be used for directing the fabric sections.

Any suitable means may be provided for lubricating the actuating shaft and the eccentrics associated therewith. As shown in the drawings, there is an oil sump 97 having a pipe 98 extending upwardly into the same. This pipe connects with a port 99 leading to the bearing for the shaft 17. It also connects with a port 100 leading to a port 101 along the outer face of the bushing 23 and to a recess 102 at the end of the main shaft. The main shaft has a chamber 103 centrally thereof with radial ports leading to the eccentrics, and the eccentrics have radial ports leading to the outer face thereof. The eccentric straps also have oil ports extending longitudinally thereof for lubricating the ball stud connections associated therewith. Suitable wicks are used in these ports and chambers for distributing the oil. It will be understood that the means for lubricating the parts may be varied and forms no part of the present invention.

It is thought the operation of the machine will be obvious from the detail description which has been given. The operator guides the fabric sections to the feed wheels which support and feed the same to the stitching mechanism. There are no parts of substantial proportions beneath the feed wheels and, therefore, there is a full clearance space for the manipulation of the fabric sections being stitched. The line of feed, as noted, is inclined toward the table, and this greatly facilitates the ease with which the fabric sections are directed to the feed wheels. The feed wheels are positively driven so that when two fabric sections are being joined, they will be evenly fed and fed uniformly to the stitching mechanism. The feeding mechanism which is positively operated by directly connected actuating parts will positively feed the fabric sections step by step for each reciprocation of the needle. The needle is directly connected to the eccentric strap which operates the same and is, therefore, moved positively back and forth without any lost motion, and will be caused to enter the fabric sections carrying the needle thread loop therethrough. As the needle begins its retracting movement, the needle thread loop is thrown out, and the cooperating looper engages said needle thread loop. This looper is preferably of the thread carrying type and it is moved back and forth in a single plane without any lateral movement. It will, with certainty, enter the needle thread loop and carry its own thread loop to a position above the fabric sections, where it is engaged by a non-thread carrying looper. The forked end of the non-thread carrying looper takes the looper thread loop and carries it inwardly and downwardly and positions it for the needle to enter. This non-thread carrying looper, moving as it does in a single plane, will with certainty, engage the looper thread loop and position the same for the needle.

There is a needle guide 104 attached to the flange 83 of the sleeve 7, which serves to guide the needle as it emerges from the fabric sections and aids in the throwing out of the needle thread loop. As shown in the drawings, there are thread tensions 105 and 106 for the threads, which tensions are carried by a bracket secured to the frame or standard of the machine. The tension 105 is for the needle thread. Sliding in the bracket supporting this tension is a plunger 108 which operates through suitable devices for separating the members of the tension 105. This plunger has the end thereof tapered so that when the lever 46 moves into engagement with the tapered end it will force the plunger inward or to the right as viewed in Fig. 3, and this will release the tension. It is only the tension on the needle thread that is released.

Access may be had to the parts within the frame or standard by cover plates 109, 110 and 111. The cover plate 111 is secured to the overhanging bracket 3 by suitable screws and gives access to the clutch mechanism for operating the feed wheels. The cover plate 110 gives access to the oil sump, and is held in place by a spring. It also gives access to the bell crank lever and the link connection therebetween and the clutch drum. The cover plate 109 gives access to the parts within the standard or frame and particularly the main shaft and the parts directly associated therewith.

It is obvious that many changes may be made in the details of construction and the parts described without departing from the spirit of the invention as set forth in the appended claims, as it is believed that the machine while of the feed cup type, contains a basically new arrangement of parts contributing to simplicity in structure and ease in the operation of the machine and in the feeding of the material being stitched.

Having thus described the invention, what I claim as new and desire to secure by Letters Patent, is:

1. In a sewing machine, the combination of a standard, a laterally extending portion carried thereby, a feeding mechanism including cooperating feed wheels located beneath said laterally extending portion, and driving means for actuating said feed wheels located entirely above the horizontal plane containing said feed wheels.

2. In a sewing machine, the combination of a standard, a bracket member extending laterally therefrom, a feeding mechanism supported by said bracket member and including vertically arranged shafts carried by and depending from said bracket member, cooperating feed wheels rigidly attached to the lower ends of said shafts, and means for actuating said feed wheels.

3. In a sewing machine, the combination of a standard, a bracket member extending laterally therefrom, a feeding mechanism supported by said bracket member and including vertically arranged shafts carried by and depending from said bracket member, cooperating feed wheels rigidly attached to the lower ends of said shafts, means for actuating said feed wheels, said actuating means for the feed wheels including a main shaft, and devices operated thereby for imparting an intermittent movement to the feed wheels, said shaft and operating devices being located above the horizontal plane containing the feed wheels.

4. In a sewing machine, the combination of a standard, a bracket member extending laterally therefrom, vertical shafts supported in and depending from said bracket member, cooperating feed wheels on the lower ends of said shafts, a driving shaft supported in bearings in said standard and above the horizontal plane containing the feed wheels, and devices actuated by said driving shaft for operating the feed wheels.

5. In a sewing machine, the combination of stitch forming mechanism, a standard, a bracket member extending laterally therefrom, vertically disposed shafts supported in and depending from said bracket member, feed wheels at the lower ends of said shafts, a driving shaft supported in bearings in said standard above a horizontal plane containing the feed wheels, and devices operated by the driving shaft for actuating said feed wheels, said stitch forming mechanism including operating connections with said driving shaft.

6. In a sewing machine, the combination of a standard, a bracket extending laterally therefrom, cooperating stitch forming devices located at one side of the standard and beneath said bracket, feed wheels suspended from said bracket, a driving shaft in said standard, and devices operated thereby for actuating the feed wheels and the stitch forming devices.

7. In a sewing machine, the combination of a standard, a bracket extending laterally therefrom, cooperating stitch forming devices located at one side of the standard and beneath said bracket, feed wheels suspended from said bracket, a driving shaft in said standard, and devices operated thereby for actuating the feed wheels and the stitch forming devices, said shaft and actuating devices being disposed above a horizontal plane containing the feed wheels.

8. In a sewing machine, the combination of a standard, a bracket extending laterally therefrom, cooperating stitch forming devices located at one side of said standard and including a needle movable in a single plane, a looper adapted to engage the needle thread loop and movable in a single plane, a second looper cooperating with the first-named looper and with the needle as it enters the fabric movable in a single plane, and cooperating feed wheels suspended from said bracket for supporting and feeding the fabric sections to said stitch forming devices.

9. In a sewing machine, the combination of a standard, a bracket extending laterally therefrom, cooperating stitch forming devices located at one side of said standard and including a needle movable in a single plane, a looper adapted to engage the needle thread loop and movable in a single plane, a second looper cooperating with the first-named looper and with the needle as it enters the fabric movable in a single plane, vertical shafts mounted in and depending from said bracket, and cooperating feed wheels rigidly secured to the lower ends of said shafts for supporting and feeding the fabric sections to said stitch forming devices.

10. In a sewing machine, the combination of a standard, a bracket extending laterally therefrom at one side, cooperating stitch forming devices located at said side of said standard and including a needle movable in a single plane, a looper adapted to engage the needle thread loop and movable in a single plane, a second looper cooperating with the first-named looper and with the needle as it enters the fabric movable in a single plane, cooperating feed wheels rotating about vertical axes for supporting and feeding the material to the stitch forming devices, a driving shaft in said standard, and means actuated thereby for operating said stitch forming devices and for operating said feed wheels, said driving shaft and said operating means being disposed above a horizontal plane containing the feed wheels.

11. In a sewing machine, the combination of a standard, a bracket extending laterally therefrom at one side, cooperating stitch forming devices located at said side of said standard and including a needle movable in a single plane, a looper adapted to engage the needle thread loop and movable in a single plane, a second looper cooperating with the first-named looper and with the needle as it enters the fabric movable in a single plane, cooperating feed wheels rotating about vertical axes for supporting and feeding the material to the stitch forming devices, a driving shaft in said standard above said feed wheels, an eccentric member carried by said shaft and connected to said needle for imparting a movement thereto, an eccentric member carried by said shaft and connected to said first looper for imparting its movement thereto, an eccentric member carried by the driving shaft and connected to said second looper for imparting its movements thereto, and means operated by said driving shaft for operating said feed wheels.

12. In a sewing machine, the combination of a standard, a bracket extending laterally therefrom at one side, cooperating stitch forming devices located at said side of said standard, a needle movable back and forth, a looper adapted to engage the needle thread loop, a looper carrier for the looper mounted for oscillation about a fixed axis, a second looper cooperating with the first looper and with the needle, a carrier for said second looper mounted for oscillation about a fixed axis, and feed wheels mounted for rotation about vertical axes for supporting and feeding the fabric sections to the stitch forming devices, the axes of the feed wheels being disposed in a plane cutting a vertical plane containing the path of movement of the needle at an acute angle.

13. In a sewing machine, the combination of a standard, a bracket extending laterally therefrom, cooperating stitch forming devices located at one side of said standard, a needle movable back and forth, a looper adapted to engage the needle thread loop, a looper carrier for the looper mounted for oscillation about a fixed axis, a second looper cooperating with the first looper and with the needle, a carrier for said second looper mounted for oscillation about a fixed axis, vertical shafts mounted in and depending from said bracket, and cooperating feed wheels mounted on the lower ends of said shafts for supporting and feeding fabric sections to the stitch forming devices.

14. In a sewing machine, the combination of a standard, a bracket extending laterally therefrom, cooperating stitch forming devices located at one side of said standard, a needle movable back and forth, a looper adapted to engage the needle thread loop, a looper carrier for the looper mounted for oscillation about a fixed axis, a second looper cooperating with the first looper and with the needle, a carrier for said second looper mounted for oscillation about a fixed axis, vertical shafts mounted in and depending from said bracket, and cooperating feed wheels mounted on the lower ends of said shafts for supporting and feeding fabric sections to the stitch forming devices, said shafts being mounted in a plane cutting a vertical plane containing the needle at an acute angle.

15. In a sewing machine, the combination of a standard, a bracket extending laterally therefrom at one side, cooperating stitch forming devices located at said side of said standard, a needle movable back and forth, a looper adapted to engage the needle thread loop, a looper carrier for the looper mounted for oscillation about a fixed axis, a second looper cooperating with the first looper and with the needle, a carrier for said second looper mounted for oscillation about a fixed axis, and feed wheels mounted for rotation about vertical axes for supporting and feeding the fabric sections to the stitch forming devices, said axes of the feed wheels being in a vertical plane disposed at an acute angle to the general direction in which said bracket extends from the standard.

16. In a sewing machine, the combination of a standard, a bracket extending laterally therefrom at one side, cooperating stitch forming devices including a needle at said side of said standard, and feed wheels mounted for rotation about vertical axes, the axes of said feed wheels being located in a plane cutting a vertical plane containing the path of movement of the needle at an acute angle.

17. In a sewing machine, the combination of a standard, a bracket extending laterally therefrom at one side, cooperating stitch forming devices including a needle at said side of said standard, feed wheels mounted for rotation about vertical axes, the axes of said feed wheels being located in a plane cutting a vertical plane containing the path of movement of the needle at an acute angle, and a driving shaft in said standard for operating said stitch forming devices and said feed wheels, the axis of said shaft being at right angles to the plane containing the path of movement of the needle.

18. In a sewing machine, the combination of a standard, a bracket extending laterally therefrom, stitch forming devices including a needle movable back and forth in a vertical plane, and vertically disposed shafts mounted in and depending from said bracket, feed wheels carried thereby, the axes of said shafts being located in a plane cutting the vertical plane containing the path of movement of the needle at an acute angle.

19. In a sewing machine, the combination of a standard, a bracket extending laterally therefrom, stitch forming devices including a needle movable back and forth in a vertical plane, and vertically disposed shafts mounted in and depending from said bracket, feed wheels carried thereby, the axes of said shafts being located in a plane cutting the vertical plane containing the path of movement of the needle at an acute angle, said plane containing the axes of the shafts being disposed so that the line of feed is in a direction approaching the standard.

20. In a sewing machine, the combination of a standard, a bracket extending laterally therefrom, stitch forming devices including a needle movable back and forth in a vertical plane, vertically disposed shafts mounted in and depending from said bracket, feed wheels carried thereby, the axes of said shafts being located in a plane cutting the vertical plane containing the path of movement of the needle at an acute angle, and a main shaft in said standard for operating said stitch forming devices and said feed wheels, the axis of said shaft being at right angles to the vertical plane containing the path of movement of the needle.

21. In a sewing machine, the combination of a standard, a bracket extending laterally therefrom at one side, cooperating feed wheels mounted for rotation about vertical axes at said side of said standard, stitch forming devices including a curved needle, a pivoted arm carrying said needle, a driving shaft in said standard, an eccentric member on said shaft, a member cooperating therewith and directly connected to said arm for oscillating said needle, a looper adapted to engage the needle thread loop, an arm carrying said looper, means for supporting and oscillating said arm, an eccentric member on the driving shaft, a member cooperating therewith and directly connected to said means for oscillating the looper supporting arm, a second looper, an arm carrying the same, means for supporting and oscillating said arm, an eccentric member on said driving shaft, and a member cooperating therewith and directly connected to the oscillating means for the arm for the second looper.

22. In a sewing machine, the combination of a standard, a bracket extending laterally therefrom, cooperating feed wheels mounted for rotation about vertical axes, stitch forming devices including a curved needle, a pivoted arm carrying said needle, a driving shaft in said standard, an eccentric member on said shaft, a member cooperating therewith and directly connected to said arm for oscillating said needle, a looper adapted to engage the needle thread loop, an arm carrying said looper, means for supporting and oscillating said arm, an eccentric member on the driving shaft, a member cooperating therewith and directly connected to said means for oscillating the looper supporting arm, a second looper, an arm carrying the same, means for supporting and oscillating said arm, an eccentric member on said driving shaft, a member cooperating therewith and directly connected to the oscillating means for the arm for the second looper, vertical shafts carried by said bracket and depending therefrom and supporting at their lower ends said feed wheels, a clutch drum for intermittently operating one of said shafts, means for imparting positive movement from the first shaft to the second shaft carrying the feed wheels, an eccentric member on the driving shaft, a member cooperating therewith, a bell crank operated thereby, and an operating link attached to the bell crank for actuating the clutch drum.

23. In a sewing machine, the combination of a standard, a bracket extending laterally therefrom, a shaft mounted in and depending from said bracket, an outer feed wheel carried at the lower end of said shaft, means for positively and intermittently rotating said shaft, a second shaft, an inner feed wheel carried at the lower end thereof and cooperating with said first-named feed wheel, means for positively driving said shaft from the actuated shaft supporting the outer feed wheel, and means for supporting said shaft carrying the inner feed wheel whereby said inner feed wheel may be moved away from the outer feed wheel for the insertion and removal of the material.

24. In a sewing machine, the combination of a standard, a bracket extending laterally therefrom, a shaft mounted in and depending from said bracket, an outer feed wheel carried at the lower end of said shaft, means for positively and intermittently rotating said shaft, a second shaft, an inner feed wheel carried at the lower end thereof and cooperating with said first-named feed wheel, means for positively driving said shaft from the actuated shaft supporting the outer feed wheel, means for supporting said shaft carrying the inner feed wheel whereby said inner feed wheel may be moved away from the outer feed wheel for the insertion and removal of the material, and a stitch forming mechanism including a needle movable in a vertical plane, the axes of said shafts being disposed in a vertical plane cutting the vertical plane containing the needle at an acute angle, said means for supporting said inner feed wheel being constructed so that the axis of the feed wheel is shiftable in a vertical plane containing the axes of said feed wheels.

25. In a sewing machine, the combination of a standard, a bracket extending laterally therefrom, a shaft mounted in and depending from said bracket, an outer feed wheel carried at the lower end of said shaft, means for positively and intermittently rotating said shaft, a second shaft, an inner feed wheel carried at the lower end thereof and cooperating with said first-named feed wheel, means for positively driving said shaft from the actuated shaft supporting the outer feed wheel, means for supporting said shaft carrying the inner feed wheel whereby said inner feed wheel may be moved away from the outer feed wheel for the insertion and removal of the material, and a stitch forming mechanism including a needle movable in a vertical plane, the axes of said shafts being disposed in a vertical plane cutting the vertical plane containing the needle at an acute angle, said means for supporting said inner feed wheel being constructed so that the axis of the feed wheel is shiftable in a vertical plane containing the axes of said feed wheels, said needle being carried by an arm mounted for oscillation about a center above the feed wheels.

26. In a sewing machine, the combination of a standard, a bracket extending laterally therefrom, a shaft mounted in and depending from said bracket, an outer feed wheel carried at the lower end of said shaft, means for positively and intermittently rotating said shaft, a second shaft, an inner feed wheel carried at the lower end thereof and cooperating with said first-named feed wheel, means for positively driving said shaft from the actuated shaft supporting the outer feed wheel, means for supporting said shaft carrying the inner feed wheel whereby said inner feed wheel may be moved away from the outer feed wheel for the insertion and removal of the material, a stitch forming mechanism including a needle movable in a vertical plane, the axes of said shafts being disposed in a vertical plane cutting the vertical plane containing the needle at an acute angle, said means for supporting said inner feed wheel being constructed so that the axis of the feed wheel is shiftable in a vertical plane containing the axes of said feed wheels, a spring-pressed plunger engaging the support for the shaft carrying the inner feed wheel and yieldingly moving said feed wheel into engagement with the fabric sections, and a lever mounted on the standard and connected to the supporting means for the shaft carrying the inner feed wheel for moving the same away from the outer feed wheel.

27. In a sewing machine, the combination of a standard, a bracket extending laterally therefrom, a shaft mounted in and depending from said bracket, an outer feed wheel carried at the lower end of said shaft, means for positively and intermittently rotating said shaft, a second shaft, an inner feed wheel carried at the lower end thereof and cooperating with said first-named feed wheel, means for positively driving said shaft from the actuated shaft supporting the outer feed wheel, means for supporting said shaft carrying the inner feed wheel whereby said inner feed wheel may be moved away from the outer feed wheel for the insertion and removal of the material, a stitch forming mechanism including a needle movable in a vertical plane, the axes of said shafts being disposed in a vertical plane cutting the vertical plane containing the needle at an acute angle, said means for supporting said inner feed wheel being constructed so that the axis of the feed wheel is shiftable in a vertical plane containing the axes of said feed wheels, a spring-pressed plunger engaging the support for the shaft carrying the inner feed wheel and yieldingly moving said feed wheel into engagement with the fabric sections, a lever mounted on the standard and connected to the supporting means for the shaft carrying the inner feed wheel for moving the same away from the outer feed wheel, tension devices mounted on the standard, and means actuated by said lever for releasing the tensions when the feed wheels are separated.

23. In a sewing machine, a standard, a bracket extending laterally therefrom, supporting sleeves mounted on and depending from said bracket, shafts mounted in said sleeves, a feed wheel attached to the lower end of each shaft at the lower end of each sleeve, a flange carried at the lower end of each sleeve, stitch forming devices including a needle movable over said feed wheels, a needle guide, a stitch finger, a fabric stripper mounted on the flange of the sleeve carrying the outer feed wheel, and a fabric stripper and guide mounted on the flange of the sleeve associated with the inner feed wheel.

29. In a sewing machine, the combination of a standard, a member extending outwardly therefrom, a feeding mechanism including cooperating feed wheels supported by said member, said feed wheels being located wholly at one side of said standard, and stitch forming devices adapted to operate on the material fed by the feed wheels, said stitch forming devices operating on said fabric adjacent the feed wheels and between the feed wheels and said member.

30. In a sewing machine, the combination of a standard, fabric feeding means supported by said standard including a pair of feed wheels located at one side of said standard and rotating about axes substantially parallel with the standard, means for supporting said feed wheels whereby the feed wheel adjacent the standard is yieldingly moved toward the other feed wheel for clamping and feeding the fabric, means for connecting said feed wheels whereby the same are rotated in unison, and means for intermittently rotating said feed wheels.

31. In a sewing machine, the combination of a standard, a bracket projecting outwardly therefrom, a feed wheel mounted for rotation in said bracket, a member mounted on said bracket and movable relative thereto, a second feed wheel mounted for rotation in said member, and means operating to yieldingly move said member whereby the feed wheel is yieldingly moved toward the other feed wheel for clamping and feeding the fabric.

32. In a sewing machine, the combination of a standard, a bracket projecting outwardly therefrom, a fabric feeding mechanism including inner and outer feed wheels, means for connecting said feed wheels whereby the same are rotated in unison, and means for intermittently rotating said feed wheels, means for supporting said inner feed wheel on said bracket so that it is movable toward and away from the outer feed wheel, spring means for yieldingly pressing said inner feed wheel into engagement with the outer feed wheel, and manually controlled means for moving the inner feed wheel away from the outer feed wheel.

33. In a sewing machine, the combination of a standard, a bracket projecting outwardly therefrom, a fabric feeding mechanism including inner and outer feed wheels, means for supporting said inner feed wheel on said bracket so that it is movable toward and away from the outer feed wheel, spring means for yieldingly pressing said inner feed wheel into engagement with the outer feed wheel, manually controlled means for moving the inner feed wheel away from the outer feed wheel, and means for positively rotating said inner and outer feed wheels.

34. In a sewing machine, the combination of a standard, a hollow bracket extending laterally therefrom as a continuation of the top thereof, cooperating stitch forming devices located at one side of said standard and including a needle movable in a single plane, a looper adapted to engage the needle thread loop and movable in a single plane, and a second looper cooperating with the first-named looper and with the needle as it enters the fabric movable in a single plane, and cooperating feed wheels rotating about vertical axes for supporting and feeding the material to the stitch forming devices, at least one of said feed wheels being suspended from and driven through said laterally extending bracket.

35. In a sewing machine, the combination of a standard, a bracket extending laterally therefrom, cooperating stitch forming devices located at one side of said standard and including a needle movable in a single plane, a looper adapted to engage the needle thread loop and movable in a single plane, and a second looper cooperating with the first-named looper and with the needle as it enters the fabric movable in a single plane, and cooperating feed wheels rotating about vertical axes for supporting and feeding the material to the stitch forming devices, said feed wheels being positioned in inner and outer relation with respect to said standard and the outer feed wheel being suspended from and driven through said laterally extending bracket.

36. In a sewing machine, the combination of a standard, a hollow bracket extending laterally therefrom, cooperating stitch forming devices located at one side of said standard and in major part under said laterally extending bracket, said devices including a needle movable in a single plane, a looper adapted to engage the needle thread loop and movable in a single plane, and a second looper cooperating with the first-named looper and with the needle as it enters the fabric movable in a single plane, and cooperating feed wheels in inner and outer relation with respect to said standard rotating about vertical axes for supporting and feeding the material to the stitch forming devices, the outer feed wheel being suspended from and driven through said laterally extending bracket.

37. In a sewing machine, the combination of a standard, a bracket extending laterally therefrom at one side, cooperating stitch forming devices located at said side of said standard and including a needle movable back and forth, a looper adapted to engage the needle thread loop, a looper carrier for the looper mounted for oscillation about a fixed axis, said axis being substantially inclined to a vertical plane containing the needle and also to a vertical plane containing the fabric sections being stitched, a second looper cooperating with the first looper and with the needle, a carrier for said second looper mounted for simple oscillation about a fixed axis and thereby causing the point of said second looper to move in a path concentric with said axis, and feed wheels mounted for rotation about vertical axes for supporting and feeding the fabric sections to the stitch forming devices.

38. In a sewing machine, the combination of a standard, a bracket extending laterally therefrom at one side, cooperating stitch forming devices located at said side of said standard and including a needle movable back and forth, a looper adapted to engage the needle thread loop, a looper carrier for the looper mounted for oscillation about a fixed axis, a second looper cooperating with the first looper and with the needle, a carrier for said second looper mounted for simple oscillation about a fixed axis which is inclined to a vertical plane containing the needle and thereby causing the point of said second looper to move in a path concentric with said axis, and feed wheels mounted for rotation about vertical axes for supporting and feeding the fabric sections to the stitch forming devices.

39. In a sewing machine, the combination of a standard, a bracket extending laterally therefrom, cooperating stitch forming devices located at one side of said standard and including a needle movable back and forth, a looper adapted to engage the needle thread loop, a looper carrier for the looper mounted for oscillation about a fixed axis, a second looper cooperating with the first looper and with the needle, a carrier for said second looper mounted for oscillation about a fixed axis, and feed wheels mounted in inner and outer relation with respect to said standard for rotation about vertical axes for supporting and feeding the fabric sections to the stitch forming devices, the outer feed wheel being suspended from and driven through the laterally extending bracket.

40. In a sewing machine, the combination of a standard, a bracket extending laterally therefrom, cooperating stitch forming devices located at one side of said standard and including a needle movable back and forth, a looper adapted to engage the needle thread loop, a looper carrier for the looper mounted for oscillation about a fixed axis, a second looper cooperating with the first looper and with the needle, a carrier for said second looper mounted for oscillation about a fixed axis which is outside of said standard and is inclined upwardly toward the vertical plane containing the needle, and feed wheels mounted for rotation about vertical axes for supporting and feeding the fabric sections to the stitch forming devices, at least one of said feed wheels being suspended from and driven through said laterally extending bracket.

41. In a sewing machine, the combination of a standard, a bracket extending laterally therefrom at one side, cooperating stitch forming devices located at said side of said standard, a needle movable back and forth, a looper adapted to engage the needle thread loop, a looper carrier for the looper mounted for oscillation about a fixed axis, a second looper cooperating with the first looper and with the needle, a carrier for said second looper mounted for simple oscillation about a fixed axis and thereby causing the point of said second looper to move in a path concentric with said axis, both of said fixed axes being disposed at a substantial acute angle to a vertical plane containing the needle, and feed wheels mounted for rotation about vertical axes for supporting and feeding the fabric sections to the stitch forming devices.

42. In a sewing machine, the combination of a standard, a bracket extending laterally therefrom at one side, cooperating stitch forming devices located at said side of said standard and including a needle movable back and forth, a looper adapted to engage the needle thread loop, a looper carrier for the looper mounted for oscillation about a fixed axis, a second looper cooperating with the first looper and with the needle, a carrier for said second looper mounted for simple oscillation about a fixed axis and thereby causing the point of said second looper to move in a path concentric with said axis, both of said fixed axes being disposed at a substantial acute angle to a vertical plane containing the needle so that the paths of the ends of said loopers will nearly intersect above the edges of the fabric sections being stitched at a point substantially in advance of the vertical plane containing the needle, and feed wheels mounted for rotation about vertical axes for supporting and feeding the fabric sections to the stitch forming devices.

43. In a cup-feed sewing machine in which the advance of the fabric is accomplished by the coincident intermittent rotation of tangent feed wheels, a stitch forming mechanism comprising a single needle, a single thread carrying looper, and a single non-thread carrying looper each of said three stitch forming elements being confined to simple back and forth movement over the same path in both directions, the paths of the ends of said loopers passing close to the path of said needle and substantially intersecting at a point above the edges of the fabric sections being joined and substantially in advance of the vertical plane containing the needle.

44. In a cup-feed sewing machine in which the advance of the fabric is accomplished by the coincident intermittent rotation of tangent feed wheels, a stitch forming mechanism comprising a single needle, a single thread carrying looper, and a single non-thread carrying looper, each of said three stitch forming elements being confined to simple back and forth movement over the same path in both directions, the path of said thread carrying looper extending through the point of engagement with the needle thread loop close to the needle upwardly at a substantial angle and away from the vertical plane containing the needle to a point over and beyond the edge of the fabric, and the path of said non-thread carrying looper extending through the point of engagement with the looper thread downwardly at an angle to the vertical plane containing the needle toward the inner side of the fabric so as to position the looper thread loop for the needle to enter as it advances for entering the fabric sections.

45. In a cup-feed sewing machine in which the advance of the fabric is accomplished by the coincident intermittent rotation of tangent feed wheels, a stitch forming mechanism comprising a single needle, a single thread carrying looper, and a single non-thread carrying looper, each of said three stitch forming elements being confined to simple back and forth movement over the same path in both directions, the path of the point of said thread carrying looper being arcuate and having its chord disposed in a vertical plane intersecting a vertical plane along the line of feed at an acute angle, said chord also being inclined upwardly at a substantial angle in the direction of the loop-taking stroke of the looper.

N. V. CHRISTENSEN.